US011706637B2

(12) United States Patent
Baisch et al.

(10) Patent No.: US 11,706,637 B2
(45) Date of Patent: Jul. 18, 2023

(54) NODES FOR HIGH FREQUENCY FIXED WIRELESS ACCESS NETWORK

(71) Applicant: Starry, Inc., Boston, MA (US)

(72) Inventors: Andrew Baisch, Somerville, MA (US); Nicholas Kalita, Needham, MA (US); Joseph Thaddeus Lipowski, Norwell, MA (US); Ryan Lagoy, Quincy, MA (US); Connor James Arnold, Boston, MA (US); Lisa Hachmann, Allston, MA (US)

(73) Assignee: Starry, Inc., Boston, MA (US)

(*) Notice: Subject to any disclaimer, the term of this patent is extended or adjusted under 35 U.S.C. 154(b) by 0 days.

(21) Appl. No.: 17/332,106

(22) Filed: May 27, 2021

(65) Prior Publication Data

US 2021/0377748 A1    Dec. 2, 2021

Related U.S. Application Data

(60) Provisional application No. 63/031,058, filed on May 28, 2020.

(51) Int. Cl.
*H04L 12/66* (2006.01)
*H04W 16/28* (2009.01)
(Continued)

(52) U.S. Cl.
CPC ............ *H04W 16/28* (2013.01); *H01Q 1/42* (2013.01); *H01Q 3/34* (2013.01); *H01Q 9/0407* (2013.01); *H04W 84/12* (2013.01)

(58) Field of Classification Search
CPC ........ H04B 1/38; H04B 7/0617; H04B 17/21; H04B 17/318; H04L 12/46; H04L 12/462; H04L 12/66; H04L 2012/5618; H01Q 1/42; H01Q 3/34; H01Q 9/0407; H04W 16/28; H04W 84/12
See application file for complete search history.

(56) References Cited

U.S. PATENT DOCUMENTS

| 2005/0113030 A1 | 5/2005 | Gaikwad et al. |
| 2016/0278093 A1* | 9/2016 | Negus ............... H04W 72/0453 |

(Continued)

FOREIGN PATENT DOCUMENTS

| WO | WO 2017/132501 | * | 8/2017 |
| WO | WO 2018/119153 | * | 6/2018 |

OTHER PUBLICATIONS

International Search Report and Written Opinion of the International Searching Authority, dated Dec. 2, 2021, from International Application No. PCT/US2021/034452, filed on May 27, 2021. 20 pages.

(Continued)

*Primary Examiner* — Frank Duong
(74) *Attorney, Agent, or Firm* — HoustonHogle LLP (57) ABSTRACT

A high frequency data network access system leverages commodity WiFi chipsets and specifically multi spatial stream (e.g., 802.11 ac) chipsets in combination with electrically steered patch array antenna systems at the subscriber nodes. In addition, for thermal control, the high frequency components are mounted to a main body that includes a heat sink and a chimney. These components are also separated from components operating at baseband to avoid interference.

16 Claims, 9 Drawing Sheets

(51) Int. Cl.
*H01Q 1/42* (2006.01)
*H01Q 3/34* (2006.01)
*H01Q 9/04* (2006.01)
*H04W 84/12* (2009.01)

(56) References Cited

U.S. PATENT DOCUMENTS

| | | |
|---|---|---|
| 2017/0214448 A1 | 7/2017 | Lipowski et al. |
| 2017/0215089 A1* | 7/2017 | Lipowski .............. H04W 16/28 |
| 2017/0215090 A1* | 7/2017 | Lipowski ............. H04B 7/0452 |
| 2017/0215192 A1* | 7/2017 | Lipowski ............. H04W 24/04 |
| 2017/0215210 A1* | 7/2017 | Lipowski ............. H04B 7/0682 |
| 2018/0337452 A1 | 11/2018 | Lipowski |
| 2020/0106582 A1 | 4/2020 | Jalali |

OTHER PUBLICATIONS

International Preliminary Report on Patentability Received for International Application No. PCT/US2021/034452 dated Dec. 8, 2022, 15 pages.

* cited by examiner

NODES FOR HIGH FREQUENCY FIXED WIRELESS ACCESS NETWORK

RELATED APPLICATIONS

This application claims the benefit under 35 USC 119(e) of U.S. Provisional Application No. 63/031,058, filed on May 28, 2020, which is incorporated herein by reference in its entirety.

BACKGROUND OF THE INVENTION

Internet service providers (ISPs) have historically used a number of different technologies in their subscriber or access networks to deliver network connectivity to premises such as single family homes, multidwelling units (MDUs), and businesses. Initially premises were connected via dial-up connections over POTS lines, or ISDN. Often businesses used T-1 to T-3 connections.

Nowadays, DSL, cable and optical fiber networks are common in urban and metropolitan, and even rural areas to provide network access.

Fixed wireless network access has historically been another option in some areas. Wireless ISPs (or WISPs) providing the wireless network access transmit and receive data to and from endpoint nodes, usually installed at premises, as radio waves via transmission towers. This has been typically used in rural areas where cable and optical fiber networks are not available.

More recently, WISPs have begun deploying access systems in metropolitan and suburban areas. Their systems generally utilize high frequency wireless data networks, typically operating in the 10 GHz to 300 GHz band, to enable communications between aggregation nodes and one or more high frequency endpoint nodes such as fixed subscriber nodes and/or multi-dwelling unit subscriber nodes, in star-topology networks. One system employs phased arrays at the aggregation nodes. Each phased array covers a sector, and then each phased array divides its sector into subsectors.

SUMMARY OF THE INVENTION

As endpoint nodes are deployed to MDUs and possibly individual subscribers with separate homes, compactness, robustness and low cost become increasingly important.

In this vein, a statically electrically steerable patch array antenna is useful. Patch array antennas are essentially large circuit boards, making them low-cost. Being electrically steerable avoids the need for mechanical antenna pointing mechanisms. Thus, the endpoint nodes can be installed on an arbitrary exterior wall of the home, for example. Then, the patch array antenna is statically steered in azimuth, for example, to point in the direction of the desired aggregation node. In addition, that antenna can also be later steered to a different aggregation node if required to reestablish a data connection.

Thermal control is also important in these endpoint nodes. High frequency components including power amplifiers will generate heat that must be dissipated to the environment. At the same time, high frequency components operating in the many gigahertz and lowers frequency components operating at baseband such as a few gigahertz and lower should be shielded from each other.

In addition, antenna and electronic calibration is also important to proper operation.

In general, according to one aspect, the invention features a node supporting a communications link to an aggregation node in an access network. This node comprises a modem board for communicating with a router for maintaining a local area network for a premises and decoding intermediate frequency downlink signals encoding communications on a downlink from the aggregation node and encoding communications into intermediate frequency signals for an uplink to the aggregation node. In addition, an extremely high frequency board is provided for up converting the intermediate frequency uplink signals into high frequency uplink signals for transmission to the aggregation node and down converting high frequency downlink signals transmitted from the aggregation node into the intermediate frequency downlink signals. An electronically steered patch antenna array is used for receiving the high frequency downlink signals and transmitting the high frequency uplink signals. A network processor controls phase adjustments of the high frequency downlink signals from the high frequency uplink signals to the patch antenna array to establish the ink to the aggregation node.

In a current embodiment, the electronically steered patch antenna array is a one-dimensionally electronically steered patch antenna array for steering the antenna in azimuth.

A one-dimensionally adjustable mechanical pointing system can be used for adjusting a boresight of the patch antenna array in elevation.

For steering, transmit gain and phase adjusters are used adjusting a gain and phase of the high frequency uplink signals provided to columns of the patch antenna array.

In addition, receive gain and phase adjusters can be used for adjusting a gain and phase of the high frequency downlink signals received by each column of the patch antenna array.

An outer radome is preferably included with the electronically steered patch antenna array being located in the outer radome.

In a current design, a main body is also provided, in which the extremely high frequency board is mounted to one side of the main body and the modem board is mounted to another side of the main body. The outer radome preferably seals against the main body.

In addition, the main body can include a center heat sink and/or a chimney extending through the main body.

A rear plate is also useful, with modem board being held between the main body and the rear plate.

In general, according to another aspect, the invention features a node supporting a communications link to an aggregation node in an access network. The node comprises a one-dimensionally electronically steered patch antenna array for steering the antenna in azimuth and a one-dimensionally adjustable mechanical pointing system for adjusting a boresight of the patch antenna array in elevation.

In general, according to another aspect, the invention features a node supporting a communications link to an aggregation node in an access network. The node comprises an outer radome, an antenna system in the radome, a main body, an extremely high frequency board mounted to one side of the main body for down converting high frequency downlink signals received by the antenna system and up converting to generate high frequency uplink signals for transmission by the antenna system, and a modem board also mounted to the main body for communicating with a router for maintaining a local area network for a premises.

In general, according to another aspect, the invention features a method for calibrating a node supporting a communications link to an aggregation node in an access network. The method comprises transmitting high frequency signals to the node, and relating a received signal strength indicator value generated by a WiFi chipset of the node to the signal strength of the high frequency signals.

In general, according to another aspect, the invention features a method for pointing a node supporting a communications link to an aggregation node in an access network. This method comprises receiving high frequency downlink signals at a patch array antenna of the node and determining a phase adjustment of at least columns of the patch array antenna to improve the gain of the antenna.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
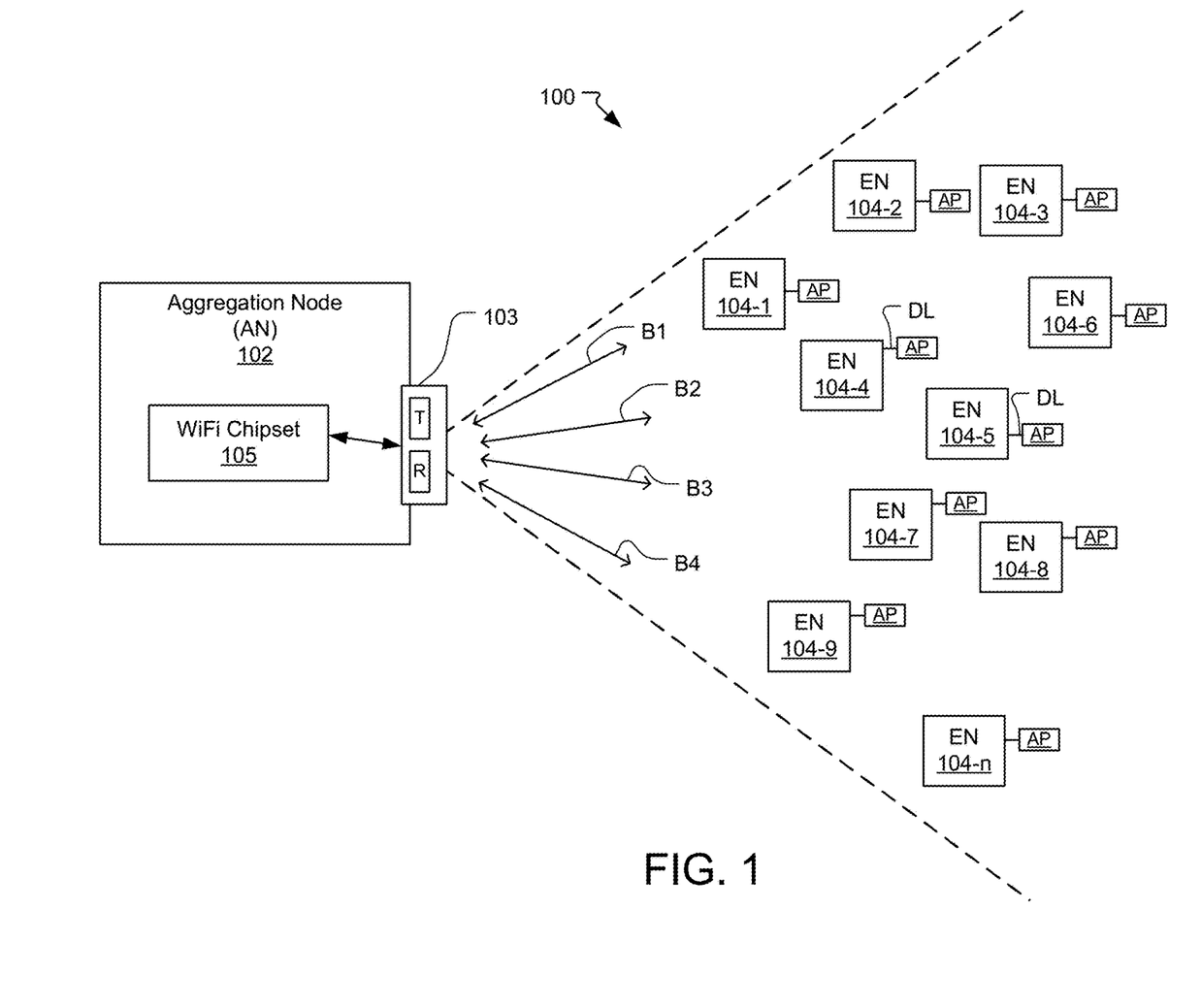
FIG. 1 is a block diagram showing different deployments of endpoint nodes with an aggregation node in a fixed wireless access system.

FIG. 1 shows a network access system 100, in which the inventive subscriber node would be deployed, in a current embodiment. In this system, a WISP would erect an aggregation node (AN) 102 that communicates with a plurality of high frequency network endpoint or subscriber nodes (EN) 104, e.g., 104-1, 104-2, . . . , and 104-n.

The aggregation node 102 preferably utilizes a phased array antenna system 103 to communicate with the endpoint nodes 104-1-104-m. The antenna system preferably covers an azimuthal arc of between about 30 degrees and 180 degrees; with about 60 degrees currently being used.

The phased array antenna system 103 forms transmit and receive beams B1-Bn for downlink and uplink, respectively, and communication with each of the endpoint nodes 104-1-104-m by executing dynamic continuous beamforming. In this way, the aggregation node 102 reduces interference between adjacent aggregation nodes, conserves power on the downlinks and reduces transmit power requirements for the endpoint nodes on the uplinks.

Each endpoint node 104 communicates with the aggregation node 102 by means of an electronic assembly or system that provides a wireless ISP (internet service provider) handoff at the premises where the endpoint node 104 is installed. The endpoint node 104 is a residential or business fixed wireless endpoint that communicates with the aggregation node 102 via high frequency network (i.e., using high frequency communication links/radios). In some embodiments, the high frequency network operates between 10 and 300 GHz, or more commonly between about 20 and 60 GHz. Specific examples include 24 GHz and 37 GHz.

Locally the endpoint node 104, in a typical residential deployment, communicates with a modem/router or WiFi access point AP over possibly a local data link DL such as WiFi tunnel (in the 2.4 or 5 GHz bands or the WiGig tri-band in the 2.4, 5 and 60 GHz bands, or IEEE 802.11ac, IEEE 802.11ad-2012) or via a wired connection (e.g., 1000BASE-T or G.hn). This modem/router or access point then maintains the local area network at the subscriber's premises.

The current endpoint node 104 employs a wired data link connection DL implementing the G.hn (Ghn) protocol. This allows an ultra-high-speed networking connection over a coaxial cable line with data rates up to 2,000 Mbps. In general, G.hn is a specification for home networking that operates over three types of legacy wires: telephone wiring, coaxial cables, and power tines.

In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

According to a preferred embodiment, the aggregation node includes one or more WiFi chipsets 105. These are commercially available systems of one or more chips that implement the IEEE 802.11 standard. These chipsets are preferably capable of maintaining multiple spatial streams such as provided by the IEEE 802.11ac or 802.11ax versions and follow-on versions of the standard. Each of these WiFi chipsets produce intermediate, such as WiFi, signals, which are signals that have been encoded according to the IEEE 802.11 standard. Typically, these intermediate signals are in the 2.4 GHz or preferably in the 5 GHz WiFi band, based on the WiFi standard. These intermediate signals are then up converted to the high frequency band between 10 and 300 GHz and transmitted to the endpoint nodes 104 on the downlink. In turn, the endpoint nodes transmit high frequency signals in the high frequency band between 10 and 300 GHz back on the uplink, which signals are down converted to intermediate or WiFi signals at the conventional frequencies such as 2.4 or 5 GHz.

Figure 2A:
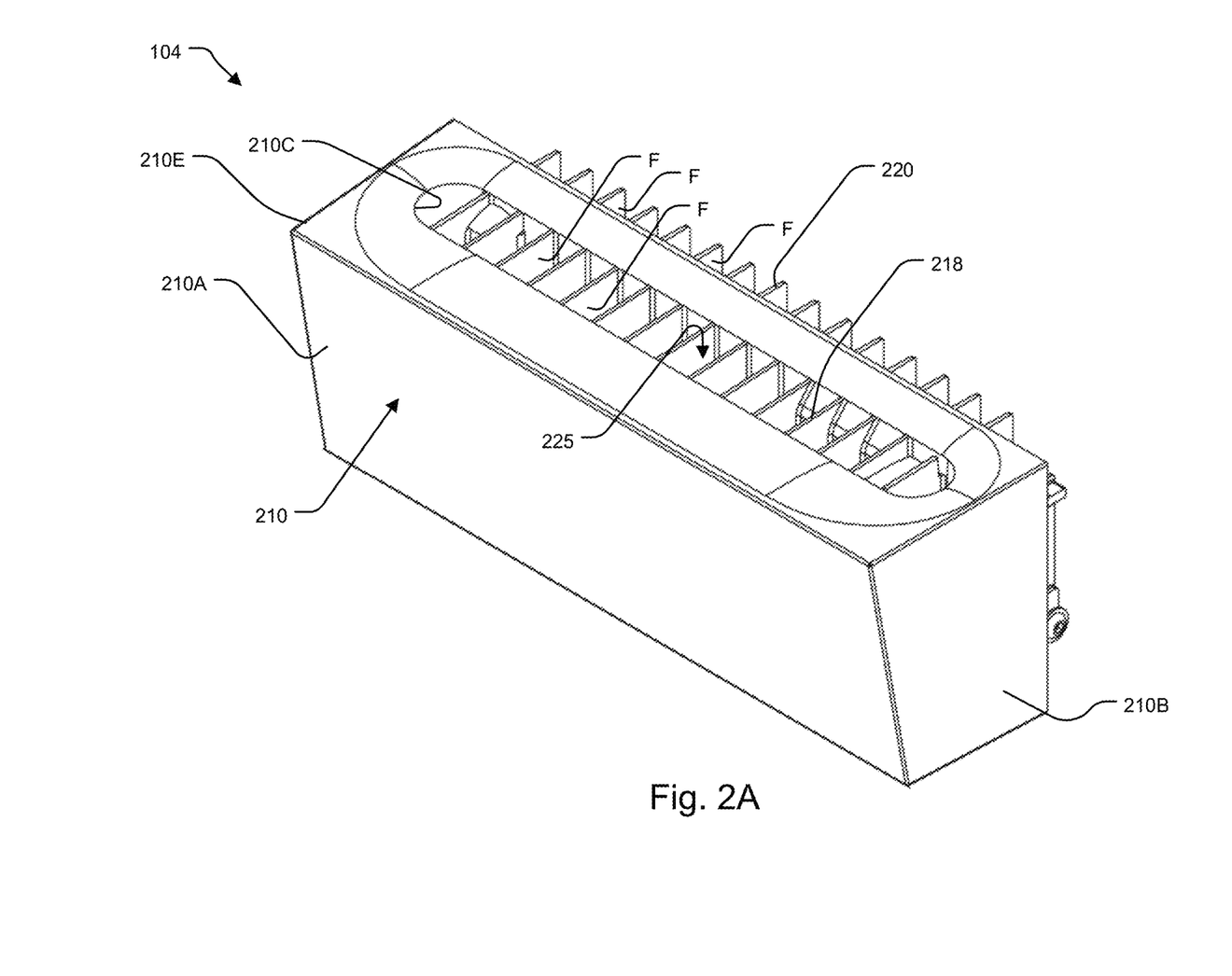
FIG. 2A is a perspective view of a subscriber node according to a current embodiment.

FIG. 2A shows an endpoint or subscriber node 104 that has been constructed according to the principles of the present invention. In general, it comprises an outer cover or radome 210. This radome 210 is characterized by a front wall 210A and sidewalls. In the illustrated orientation, the right sidewall 216B is visible, with the left sidewall 210E being on the other side.

The subscriber node 104 includes a number of features that are associated with its thermal management. The illustrated example includes a center chimney top port 210C in the radome 210. Looking through this center chimney port, a center heatsink 218 and its fins F are visible in the chimney 225. At the same time, a rear heat sink 220, also having fins F, projects in the rearward direction at the back of the subscriber node 104.

Figure 2B:
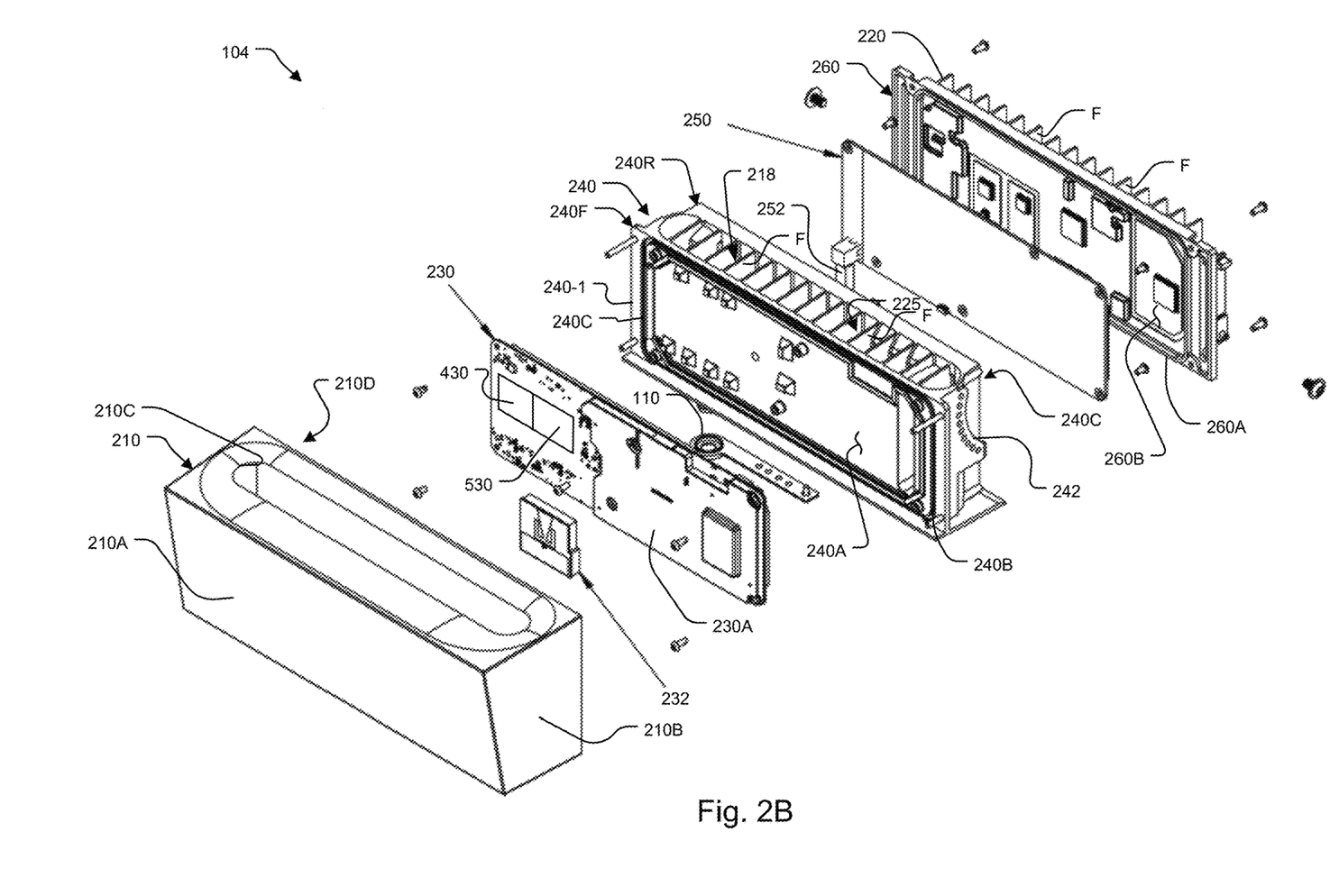
FIG. 2B is a prospective exploded view of the subscriber node.

FIG. 2B shows the subscriber node 104 and its internal components in this exploded view.

In general, there is an assembly that fits into the cavity 210D of the radome 210. This assembly generally comprises an extremely high frequency (EHF) printed circuit board (PCB) 230. This is mounted to a main body 240. In general, this main body is fabricated from cast metal such as aluminum. This main body 240 includes the center heatsink 218, a front planar member 240F, and a rear planar member 240R. The fins F bridge the gap between the front planar member 240F and rear planar member 240R to define the center chimney 225 that runs through the main body. Rearward of the main body 240 is a modem printed circuit board 250 which is in turn mounted to the distal side of the main body 240 and specifically to the rear planar member 240S. A rear plate 260 is also fabricated from cast aluminum. It further includes the integral rear heat sink 220 with vertically running fins F. The rear plate 260 bolts to the distal side of the main body 240 so that the modem printed circuit board 250 is sandwiched between the distal side of the main body 240 and the proximal side of the rear plate 260.

In general, the main body 240, the rear plate 260 and the radome 210 seal with each other in order to protect the PCB 230 and the modem PCB 250 from weather.

In more detail, the EHF PCB 230 is mounted to the front face 240A of the front planar member 240F of the main body 240. A front trough 240B formed in the main body 240 surrounds the EHF PCB 230 and receives a front gasket 240C.

Figure 2C:
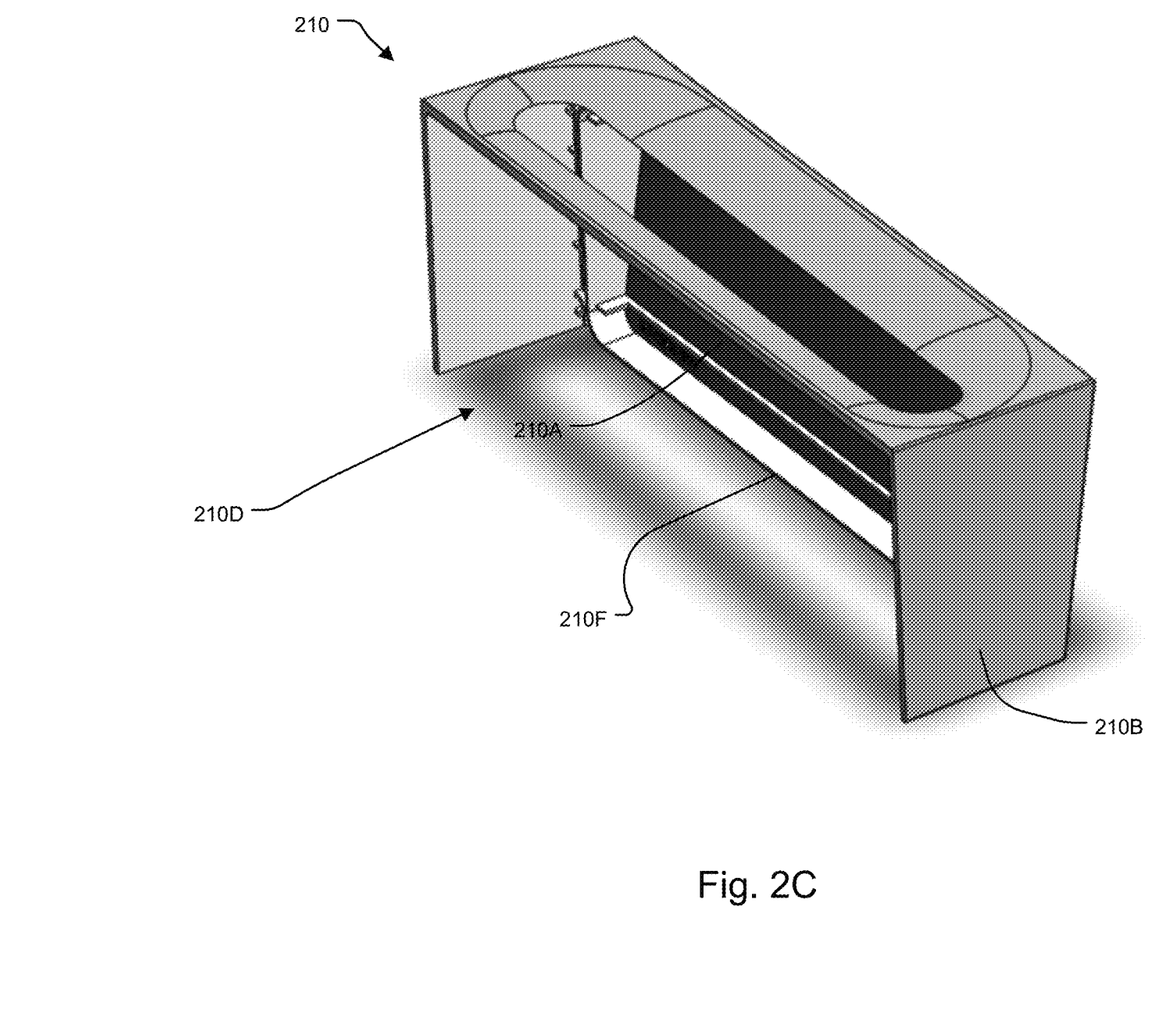
FIG. 2C is a reverse angle view of the node's radome.

FIG. 2C is a reverse angle view of the radome 210 showing features within its cavity 210D. Specifically, ridge feature 210F projects rearward from the inner side of the radome's front face 210A. This ridge feature 210E seals against the front gasket 240C so that the EHF PCB 230 is sealed within a cavity between the inner side of the front face 210A of the radome 210 and the front face 240A of the main body 240.

In turn, as shown in FIG. 2B, the main body 240 and the rear plate 260 seal with each other in order to protect the modem PCB 250. In more detail, an annular ridge 260A of the rear plate 260 seals against a rear gasket on the backside 240C of the main body 240 so that the modem PCB 250 is sealed within a cavity between the front face 260B of the rear plate 260 and the backside 240C of the main body 240.

In general, the EHF PCB 230 provides the interface to the antennas and handles the up-and-down conversion of the signals between the intermediate, such as 5 GHz Wifi band, and the spectral band of 10 GHz to 300 GHz of the transmit and receive beams B1-Bn for the downlink and the uplink.

The EHF PCB 230 includes a transmit and receive dual polarization patch antenna array 430 and a receive single polarization patch antenna array 530. The receive dual polarization patch antenna array 430 and the receive single polarization patch antenna array 530 are implemented on the same PCB or different PCB in different embodiments, which antenna PCB(s) are mounted to the EHF PCB 230. In another example, the receive dual polarization patch antenna array 430 and the receive single polarization patch antenna array 530 are implemented as part of the EHF PCB 230.

In addition, a 5 GigaHertz antenna 232 is also mounted to the EHF PCB 230 for lower frequency communication to the aggregation node 102. A shielding plate 230A is used between the EHF PCB 230 and the 5 GigaHertz antenna 232.

The EHF PCB 230 is mounted into a channel formed on the front face 240A of the main body 240. A good thermal contact is provided for the EHF PCB 230 and specifically the heat generating components on that PCB in order that their heat may be dissipated into the bulk of the center body 240 and then to the surrounding environment via the center heatsink 218 via the air flowing through the chimney and over the fins F of the heat sink.

The modem PCB 250 is mounted to the backside of the center body 240 and contains the one or more Wi-Fi chipsets that produce the intermediate or Wi-Fi signals provided to the EHF PCB 230. In addition, the Wi-Fi chipset(s) further decodes the down-converted intermediate or Wi-Fi signals provided from the EHF PCB 230.

Projecting from the modem PCB 230 downward and through the outer cover radome 210 is a coaxial connector 252 that provides power to the subscriber node 140 and the G.hn data link DL connection between the node and a local access point and/or router for maintaining the local area network for the premises.

Integral with the center body 240 are right and left detent plates, the right detent plate 242 being shown in the illustrated view. Along with a corresponding left detent plate on the distant side of the center body, these two detent plates interface with a mounting bracket for the subscriber node 104. The separate detent holes in the detent plates 242 are used for the adjustment of the subscriber node 142 on the mounting bracket. That is, the subscriber node 10B is aligned in elevation to be pointed at the desired aggregation node.

In more detail, the subscriber node 104 is physically pivoted to align the boresight of the antennas 430, 530 in elevation. The detents are spaced at roughly every 7 degrees or about half of the 3 dB beamwidth in the elevation direction. A set of LEDs assists the installer with this.

Figure 3:
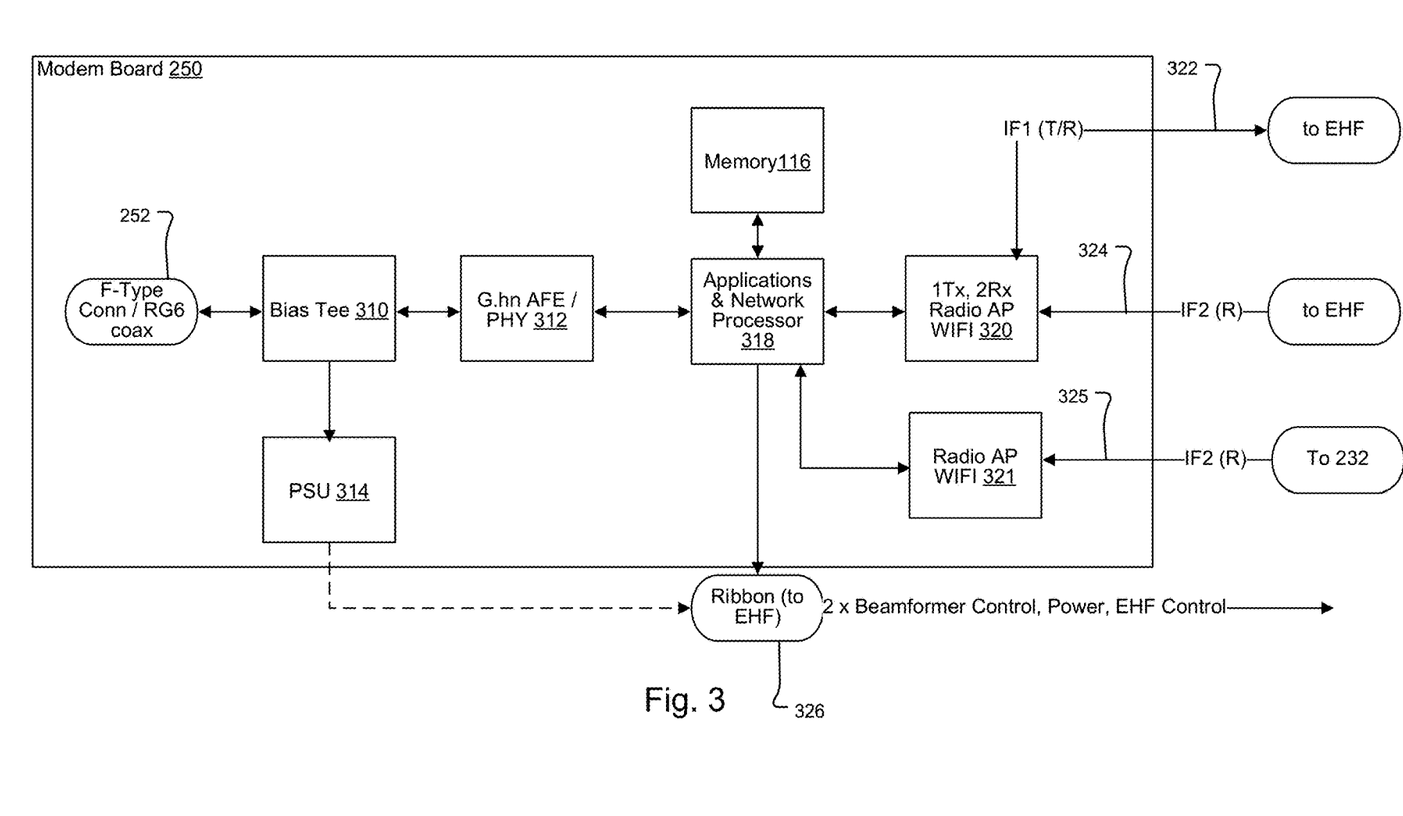
FIG. 3 is a block diagram of a modern printed circuit board for the subscriber node.

FIG. 3 shows the modem PCB board 250.

F-type connector RG coaxial cable connector 252 receives a coaxial cable that carries both power and bidirectional data. It is electrically connected to a bias T 310. This separates the electrical power to a power conditioning unit 314 that provides power to the components of the subscriber node 104. Specifically, the power conditioning unit 314 provides power to the other components on the modem board 250 along with power to the EHF PCB 230 via a ribbon connector 326.

On the other hand, the bias T 310 provides data signals to and from a G.hn analog front-end 312. In this way, an applications network processor 318 can communicate over the coaxial connection 252 through which data is uplinked and downlinked to a local router or WiFi access point AP that supports the subscriber's local area network and provides internet access via that local area network.

Wireless data transmission to and from the aggregation node is provided through a radio chipset and specifically a Wi-Fi access point chipset 320 implementing, the IEEE 802.11 ac or IEEE 802.11 ax standard, in a current generation. In the current embodiment, this 802.11 ac chipset supports two receive channels and one transmit channel. On the two receive channels, the Wi-Fi chipset receives Wi-Fi signals in the 5 gigahertz (intermediate) band and decodes those signals to resolve the received downlink data transmissions from the aggregation node. This received data is then provided to the network processor for transmission to the local router/access point AP. On the other hand, data for transmission to the aggregation node, which was received by the network processor 318 from the local router/access point AP, is encoded into 5 GigaHertz Wi-Fi intermediate frequency signals for uplink transmission on the transmit channel.

An auxiliary access point chipset 321 also implementing the IEEE 802.11 ac or IEEE 802.11 ax standard supports one or more auxiliary receive channels and one or more auxiliary transmit channels. On the auxiliary receive channels, the auxiliary Wi-Fi chipset 321 receives Wi-Fi signals in the 5 gigahertz band via the 5 GigaHertz auxiliary antenna 232 and decodes those signals to resolve the received auxiliary downlink data transmissions from the aggregation node. This received data is then provided to the network processor for transmission to the local router/access point AP. On the other hand, data for transmission to the aggregation node over the auxiliary uplink, which was received by the network processor 318 from the local router/access point AP, is encoded by the auxiliary Wi-Fi access point chipset 321 into 5 GigaHertz Wi-Fi for uplink transmission via the 5 GigaHertz auxiliary antenna 232.

Figure 4:
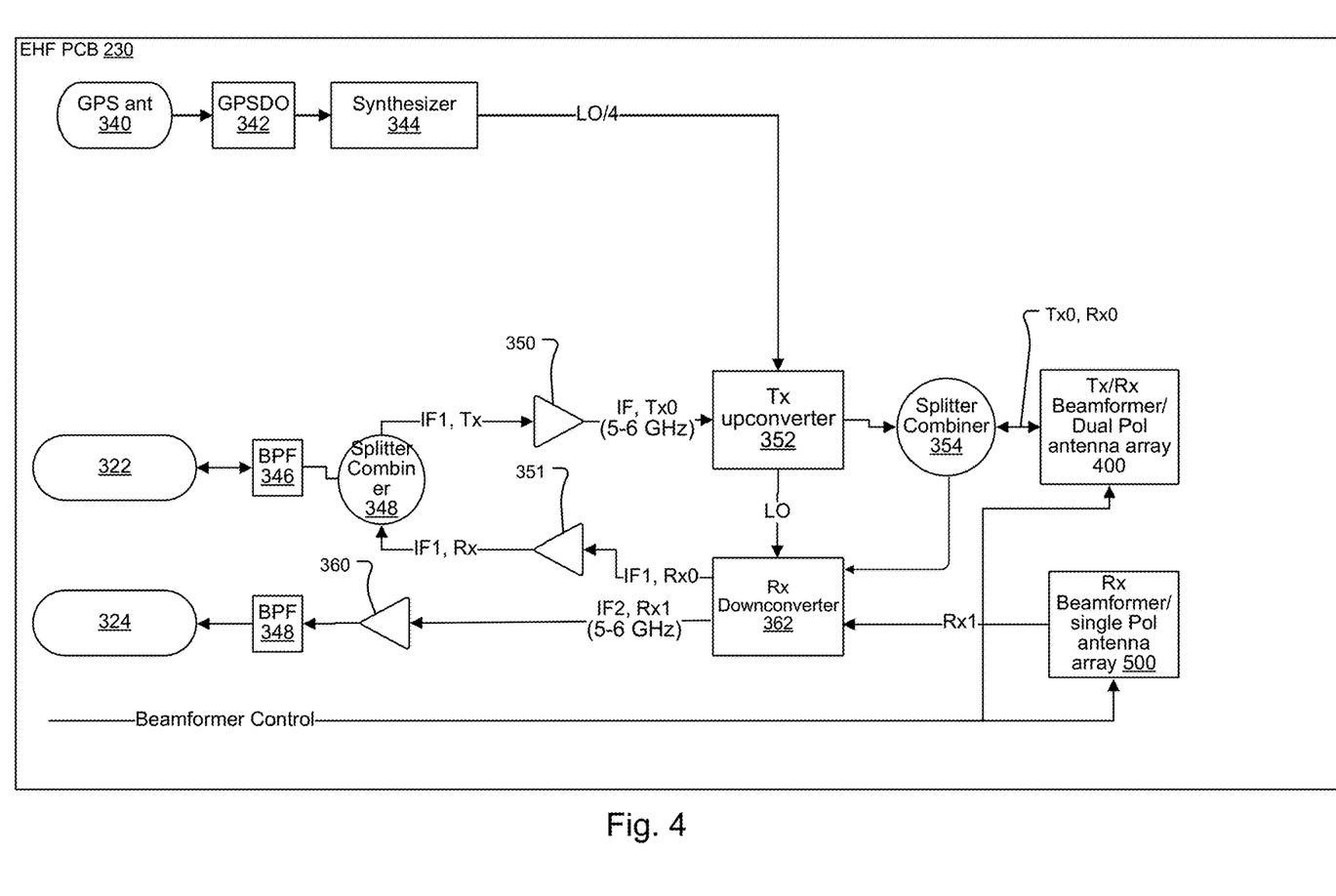
FIG. 4 is a block diagram of the extremely high-frequency printed circuit board.

FIG. 4 shows the arrangement of the EHF PCB 230.

Duplex Wi-Fi signals IF1, Tx0 are received via connection 322 from the modem board 250. A band pass filter 346 removes any spurious sidebands. A splitter combiner 348 separates the transmit intermediate frequency signals IF1, Tx0 from intermediate frequency receive signals IF1, Rx0. Specifically, the transmit signals IF1, Tx0 are provided through amplifier 350 to a transmit up converter 352. This up converter converts the signal to the desired carrier within the 10 to 300 gigahertz spectral band by mixing the 5 GHz transmit signals IF1, Tx0 with a local oscillator signal LO. A current example of transmit signals Tx0 are in 24 GHz or 37 GHz bands.

A second splitter combiner 354 provides the up converted Wi-Fi signals Tx0 to a transmit and receive beam steering/dual polarization antenna array 400.

On the other hand, the receive signals Rx0 received by the transmit and receive beam steering dual polarization antenna array 400 are separated from the transmit signals Tx0 by the splitter combiner 354. The received signals Rx0 are provided to a receive down converter 362. This down converter converts the received high frequency signals Rx0 in the 10 to 300 GigaHertz spectral band (specifically in the 24 to 37 GHz band) down to the 5 GigaHertz Wi-Fi spectral band (IF, Rx0) by mixing the receive signals Rx0 with the local oscillator signal LO. Specifically, these signals IF, Rx0 are provided through an amplifier 351 back to the splitter combiner 348 that provides them to the modem board 250.

The subscriber node in addition has a receive beam steering single polarization antenna array 500. This supports a second high frequency data link from the aggregation node in the 10 to 300 GHz spectral band. In more detail, high frequency signals Rx1 are received by the antenna array and provided to the receive down converter 362 which mixes the received signal with the local oscillator signal LO. This yields the IF2, Rx1 Wi-Fi signals in the 5 gigahertz band. They are provided to an amplifier 360 and then through bandpass filter 348 and then provided to the modem board 250 via connector 324.

Up converter 352 and the down converter 360 include respective mixers providing the up-and-down conversion function. These mixers are supplied with a synthesized local oscillator signal in the 10 to 300 gigahertz spectral band, such as a 29 or 46 GHz band that is generated from the global positioning system (GPS). In more detail, a GPS signal receiver system receives the signal broadcast from the GPS satellite system. A GPSDO 342 includes GPS disciplined oscillator (GPSDO), in combination with a GPS receiver. This produces a high-quality, stable oscillator and derived from the absolute timing source as that in the aggregation node 102 such as a quartz or rubidium oscillator. The signal is provided to a synthesizer 344 that then supplies the local oscillator mixing signal to both the up converter 352 and the down converter 362.

Figure 5:
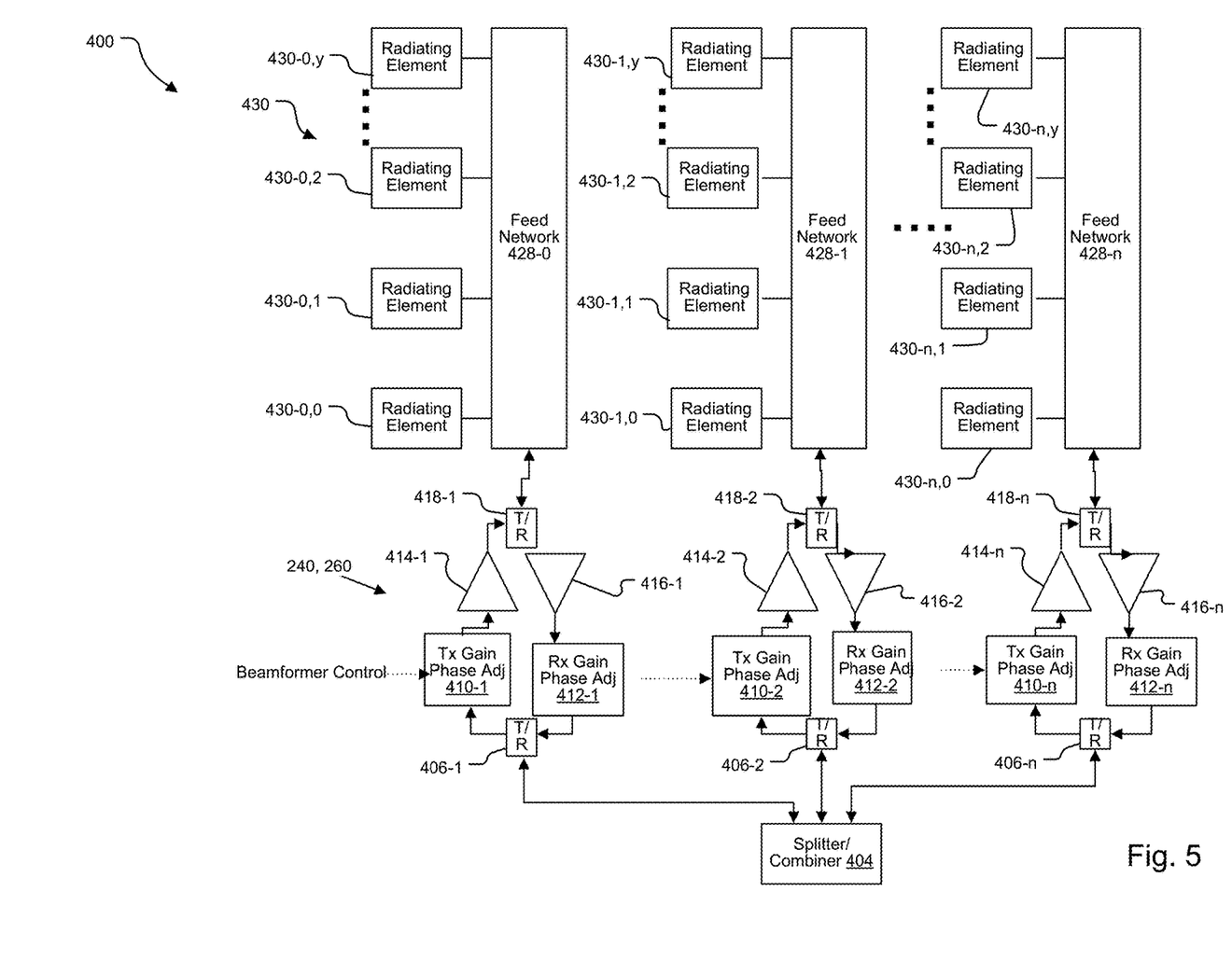
FIG. 5 is a schematic diagram of the transmission and receive beam steering dual polarized antenna array 400.

FIG. 5 is a schematic diagram of the transmission and receive beam steering dual pole antenna array 400.

In general, its antenna patch array 430 comprises a two-dimensional array of patch radiating elements $430x,y$. Each column of the radiating elements is connected to a respective feed network 428. In general, there are typically four or more radiating elements for each vertical column. In the preferred embodiment, there are eight or more elements in each column, numbered 0 through y=7. On the other hand, there are typically eight or more columns, such as 16 columns in a current embodiment, numbered 0 through n=15.

The feed network 428 associated with each column of radiating elements is provided to a respective transmit receive splitter 418. In more detail, receive signals are provided through the transmit receive splitter 418 to a hi-gain power amplifier 416. This is provided to a receive gain phase adjustment module 412 and then recombined in a transmit receive splitter 406. On the other hand, transmit signals are provided from the receive transmit splitter 406 to a transmit gain and phase adjustment module 410. The output from this module is provided to a power amplifier 414 for each column to the transmit receive splitter 418 and then to the feed network 428.

Typically, each of the receive gain phase adjustment modules 412 and the transmit gain and phase adjustment modules 410 include a digital gain controller. These can be implemented as a bank of resistors and switches and a latch for storing the gain setting of the beamformer control from the network processor. By closing the switches, different resistors are added to provide the desired power setting for the respective column.

Each of the receive gain phase adjustment modules 412 and the transmit gain and phase adjustment modules 410 also include a digital delay. These can be implemented as a bank of delay lines and switches and a latch for storing the delay setting of the beamformer control from the network processor. By closing the switches, different delays lines are added to provide the desired delay setting for the respective column.

The signals from the respective columns of the feed network are combined into a single feed in a splitter combiner 404. For transmission, that splitter combiner 404 divides the received high-frequency signal into signals to the separate feed networks.

Figure 6:
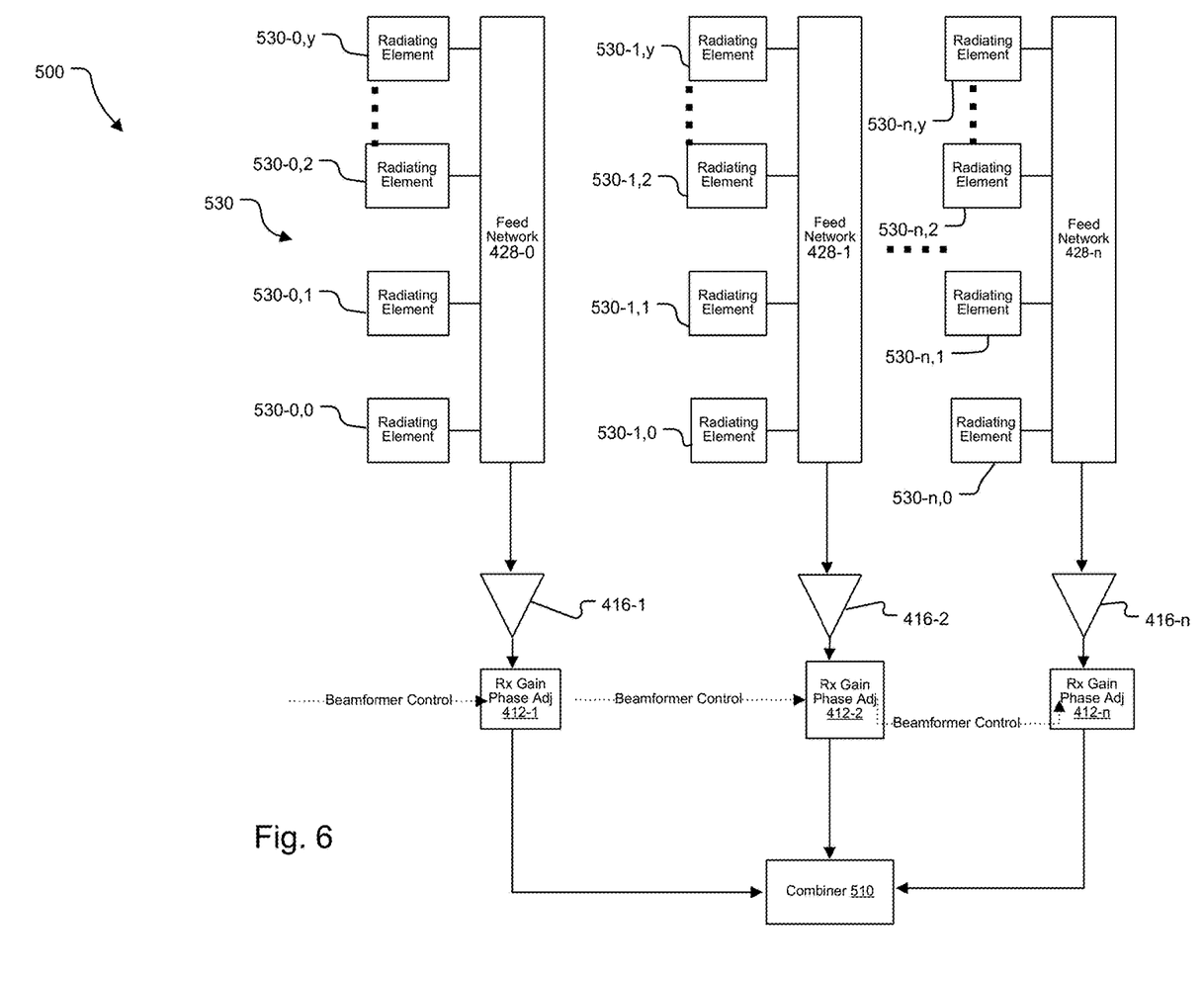
FIG. 6 is a schematic diagram of the receive beam steering single polarized antenna array 500.

FIG. 6 is a schematic diagram of the receive beam steering single pole antenna array 500.

In general, the receive beam steering single pole antenna array 500 is similar to the transmission and receive beam steering dual pole antenna array 400, but includes only the receive path.

In more detail, the receive antenna array 530 also comprises a two-dimensional array of patch radiating elements 530$x,y$, similar to the radiating elements 430$x,y$. Each column of the radiating elements is connected to a respective feed network 428.

The feed network 428 associated with each column of radiating elements is provided directly to a hi-gain power amplifier 416 for each column. The output of the amplifiers is then provided to a receive gain phase adjustment module 412 for each column and then combined in a combiner 510.

Factory/Initial Calibration of Subscriber Node 104

In general, it is useful to know the absolute gain of the front end including the antennas and signal paths of the EHF board so that the absolute RSSI (Received Signal Strength Indicator) can be calculated. The RSSI is an estimated measure of power level that a subscriber node 104 is receiving from the aggregation node in the 10 GHz to 300 GHz spectral band. This can be used by a technician to validate that the installation is proper. Or the information can be reported back to enable the overall monitoring system. It is also useful information for monitoring network optimization.

In order to point the antenna, that is, to maximize the amount of signal received on both ends of the link, the necessary predecessor is a calibrated EHF module. This is so that the absolute parameters of a particular unit are well known. This module must be calibrated for gain and phase for the linear amplifiers, and for detected power output for the power detectors. This also needs to be calibrated over temperature and frequency, which can be calibrated by equipment type, that is, once by design, or by lot, or by individual unit, as per the desired accuracy.

The entire subscriber node is placed in a test fixture, with the test equipment orthogonally positioned to the Subscriber Terminal. Then, the below procedure is used to calibrate the unit.

Figure 7:
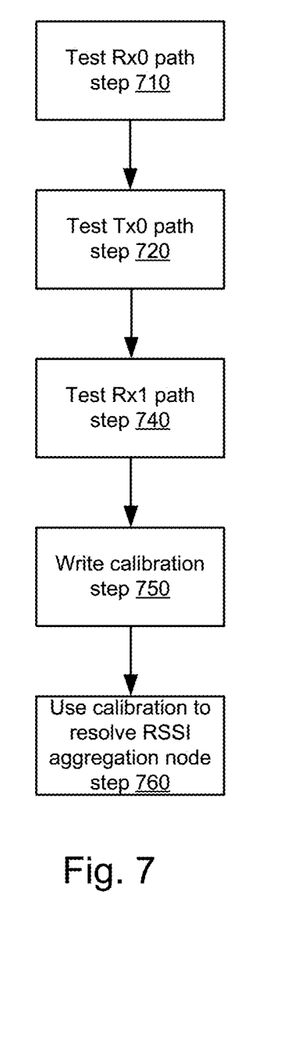
FIG. 7 is a flow diagram showing a factory calibration procedure for the subscriber node.

FIG. 7 shows a factory calibration procedure that characterizes the relationship between the RSSI indication provided by the WiFi chipset 320 and the actual signal strength from the aggregation nodes 102.

The following discussion concerns a system that is operating with center channel frequencies in the 37.1-39.9 GHz spectral band, and thus would be appropriately modified if operating elsewhere in the 10 GHz to 300 GHz spectral band.

In more detail, in step 710, Rx0 path of the Tx/Rx beam steering/dual polarization antenna array 400 is tested by stepping the receive frequency from 37.1 to 39.9, in 0.2 GHz steps. This is performed by controlling the emissions from the radiation tester. At each frequency, each of the antennas receive paths 0-15 associated with feed networks 428-0 to 428-$n$, (where n=15) are characterized in terms of the phase [deg], attenuation [dB], temperature [C], and received power [dbm]).

In step 720, Tx0 path of the Tx/Rx beam steering/dual polarization antenna array 400 is tested by stepping the transmit frequency from 37.1 to 39.9, in 0.2 GHz steps. This is performed by the network processor 318 controlling the synthesizer 344 changing the LO/4 signal provided to the Tx up converter 352. At each frequency, each of the antenna's transmit paths 0-15, associated with feed networks 428-0 to 428-$n$, (where n=15) is characterized in terms of the phase [deg], attenuation [dB], temperature [C], and power [dbm]).

In step 740, Rx1 path of the Rx beam steering/single polarization antenna array 500 is tested by stepping the receive frequency from 37.1 to 39.9, in 0.2 GHz steps. At each frequency, each of the antenna's receive paths 0-15 are characterized in terms of the phase [deg], attenuation [dB], temperature [C], and power [dbm]).

The calibration information is then written as yaml file into an EEPROM portion of memory in step 750.

Once this information is known, then the RSSI indication provided by the WiFi chipset reading of beacons from aggregation nodes 102 can be translated to the equivalent beacons at the antennas 400, 500, thus providing an accurate estimate of the received power at the antennas 400, 500. This is crucial to being able to properly point the antenna and qualify the installation of the subscriber node.

Installation Calibration of Subscriber Node 104

In the case of a 1 dimensional array as implemented Tx/Rx beam steering/dual Pol antenna array 400 and the Rx beam steering/single Pol antenna array 500, the subscriber node 104 is attached to a mechanical support pole. It should generally be facing the direction of the aggregation node 102 that will support its operation. It must then be aligned in elevation that is nearest to the boresight elevation by using a set of holes in the detent plates 242 on the unit that control its angle relative to its mounting bracket. These are set within the 3 dB elevation beamwidth.

Figure 8:
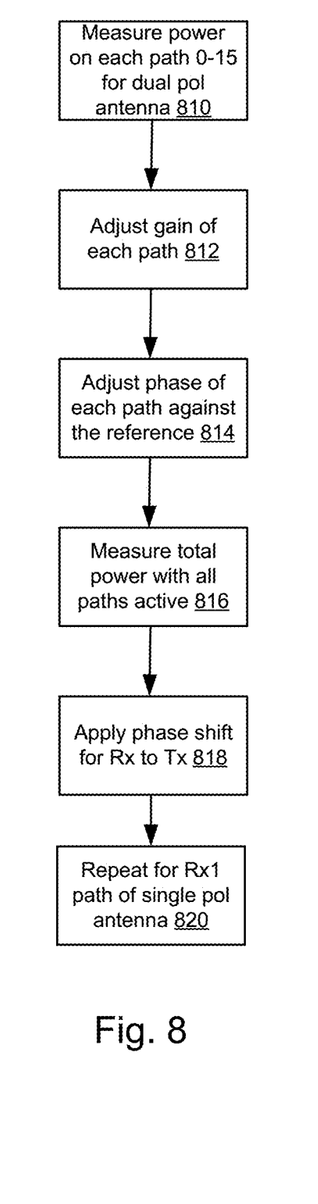
FIG. 8 is a flow diagram showing a firmware configuration procedure for the subscriber node.

FIG. 8 is a flow diagram showing the firmware configuration procedure performed during installation of the subscriber node 104.

The procedure yields the optimal Tx and Rx phase shifts to be applied by the network processor 318 to the Tx gain and phase adjusters 410 and Rx gain and phase adjusters 412 of the Tx/Rx beam steering/dual Pol antenna array 400 and the Rx gain and phase adjusters 412 of the Rx beam steering/single Pol antenna array 500.

The process starts with Rx0 signal path self-calibration of the Tx/Rx beam steering/dual Pol antenna array 400.

In step 810, the applications and network process 318 measures and records the power of the beacons with 0 dB attenuation on each path 0-15 individually for at least 5 beacons. A median filter is applied to each of the paths and the power recorded of the Rx0 signal path with the lowest power of the Tx/Rx beam steering/dual Pol antenna array 400.

Then, the gain is adjusted on each of the paths such that the powers match the power measured by the lowest path in step 812.

A reference path is then chosen. Typically, this is the middle column path 7 of the array 400. Each of the other paths is then activated individually and the phase shift adjusted of the non-reference path such that the median beacon power reading is minimized in step 814, applying the gain adjustments determined in step 812. The preferred method is a binary search algorithm, and each path adjustment is discovered when the other paths are deactivated. The phase which gives the minimum power (nulls are easier to find) is determined and 180 degrees is added to get the maximum and this phase is recorded.

Note that if the minimum power due to link budget constraints cannot be determined, then search for the maximum should be performed.

Once the previous step is complete, all paths are activated and the total power is measured. If the power increase is ~24 dB from power recorded for the single path, then calibration was successful. This corresponds to the array factor as the gain, which is about 24 dB for a 16 column array when paths are combined using isolated combiners.

These phase values for optimizing the Rx0 path are used to calculate the phase required for beamforming on Tx0 path according to the following equation.

delta_phase_deg=rx_0[freq_ghz][path][phase]−tx_0 [freq_ghz][path][phase]tx_0=rx_0_measured− delta_phase_deg The phase values for tx0 are then applied to confirm that the power received at the aggregation node is equivalent to the array gain.

The calibration as outlined above is then repeated for Rx beam steering/single Pol antenna array 500 in step 820.

The derived gain and phase values for each column of each array are then stored by the network processor 318 and then applied to the Tx gain and phase adjusters 410 and Rx gain and phase adjusters 412 during operation.

While this invention has been particularly shown and described with references to preferred embodiments thereof, it will be understood by those skilled in the art that various changes in form and details may be made therein without departing from the scope of the invention encompassed by the appended claims,

What is claimed is:

1. A node supporting a communications link to an aggregation node in an access network, the node comprising:
   a modem board for communicating with a router for maintaining a local area network for a premises and decoding intermediate frequency downlink signals encoding communications on a downlink from the aggregation node and encoding communications into intermediate frequency signals for an uplink to the aggregation node;
   an extremely high frequency board for up converting the intermediate frequency uplink signals into high frequency uplink signals for transmission to the aggregation node and down converting high frequency downlink signals transmitted from the aggregation node into the intermediate frequency downlink signals;
   an electronically steered patch antenna array for receiving the high frequency downlink signals and transmitting the high frequency uplink signals, the electronically steered patch antenna array steering by applying different delay settings for respective columns of the patch antenna array; and
   a network processor controlling phase adjustments of the high frequency downlink signals from the high frequency uplink signals to the patch antenna array to establish the link to the aggregation node.

2. The node as claimed in claim 1, wherein the electronically steered patch antenna array is a one-dimensionally electronically steered patch antenna array for steering the antenna in azimuth.

3. The node as claimed in claim 2, further comprising a one-dimensionally adjustable mechanical pointing system for adjusting a boresight of the patch antenna array in elevation.

4. The node as claimed in claim 2, further comprising transmit gain and phase adjusters for adjusting a gain and phase of the high frequency uplink signals provided to columns of the patch antenna array.

5. The node as claimed in claim 2, further comprising receive gain and phase adjusters for adjusting a gain and phase of the high frequency downlink signals received by each column of the patch antenna array.

6. The node as claimed in claim 1, further comprising:
   an outer radome, the electronically steered patch antenna array being located in the outer radome.

7. The node as claimed in claim 1, further comprising:
   a main body, wherein the extremely high frequency board mounted to one side of the main body and the modem board is mounted to another side of the main body.

8. The node as claimed in claim 7, further comprising:
   an outer radome, the main body being installed in the radome.

9. The node as claimed in claim 8, wherein the outer radome seals against the main body.

10. The node as claimed in claim 7, wherein the main body includes a center heat sink.

11. The node as claimed in claim 7, wherein the main body includes a chimney extending through the main body.

12. The node as claimed in claim 7, further comprising a rear plate, the modem board being held between the main body and the rear plate.

13. The node as claimed in claim 12, wherein the rear plate includes a rear heat sink.

14. The node as claimed in claim 12, wherein the rear plate seals against the main body, 15. A node supporting a communications link to an aggregation node in an access network, the node comprising:
   a one-dimensionally electronically steered patch antenna array for steering the antenna in azimuth, the electronically steered patch antenna array steering by applying different delay settings for respective columns of the patch antenna array; and
   a one-dimensionally adjustable mechanical pointing system for adjusting a boresight of the patch antenna array in elevation.

16. A node supporting a. communications link to an aggregation node in an access network, the node comprising:
   an outer radome; an antenna system in the radome;
   a main body;
   an extremely high frequency board mounted to one side of the main body for down converting high frequency downlink signals received by the antenna system and up converting to generate high frequency uplink signals for transmission by the antenna system; and
   a modem board mounted on another side of the main body for communicating with a router for maintaining a local area network for a premises.

* * * * *